United States Patent Office 2,833,694
Patented May 6, 1958

2,833,694
PROCESS FOR SPLITTING RACEMATES

Vladimir Prelog, Zurich, Switzerland, assignor to Ciba Pharmaceutical Products, Inc., Summit, N. J.

No Drawing. Application August 16, 1956
Serial No. 604,341

Claims priority, application Switzerland August 25, 1955

26 Claims. (Cl. 195—2)

In copending application Serial No. 604,334, filed by A. Wettstein et al., filed August 16, 1956, there is described a process in which by the action of reducing enzymes of micro-organisms upon d, l-steroids essentially only the "natural" d-form is reduced and the l-form remains unchanged. By means of this process it is accordingly possible to split racemic steroid compounds into the antipodes, the d-antipode being at the same time converted, viz. reduced.

I have now found a new process for splitting racemates. In this process racemates of bicyclic-alicyclic compounds which contain at least one grouping reducible with the formation of at least one new centre of asymmetry are subjected to the action of reducing enzymes produced by cultures of micro-organisms and at least one of the resulting optically active products is isolated and, if desired any hydrogenation product obtained is treated with a dehydrogenating agent.

The starting materials contain as reducible groupings for example carbon-oxygen and/or carbon-carbon double bonds. They belong especially to the hydronaphthalene and the hydro-indene series, for example to the dihydro-, tetrahydro-, hexahydro-, octahydro- or decahydro-naphthalene series, or to the dihydro-, tetrahydro-, hexahydro- or octahydro-indene series. They can be substituted in any desired manner. As substituents they are concerned especially free or functionally converted hydroxyl-, oxo- or carboxyl- groups, such as ester, amide, nitrile, ether, thioester, thioether, thiol- and thione-ester, acetal, mercaptal, ketal, hydrazone, semicarbazone and enol groups, in any position of the naphthalene or indene structure, or also halogen atoms or epoxy groups. The starting materials can also contain aliphatic side chains, for example substituted or unsubstituted alkyl radicals, such as methyl, ethyl, propyl or isopropyl radicals or also methyl, ethyl or propyl radicals substituted for example, by free or functionally converted hydroxyl, oxo or carboxyl groups. Specific starting materials include d:l-8-oxo-decalin, d:l-3:8-dioxo-decalin, d:l-8-oxo-9-methyl decalin, d:l-3:8-dioxo-di-methyl-decalin, d:l-3-hydroxy-8-oxo-9-methyl-decalin, d,l-$\Delta^{4,10}$-3-oxo-octalin, d:l-$\Delta^{4:10}$-3:8-dioxo-octalin, d,l-$\Delta^{4,10}$-3:8-dioxo-9-methyl-octalin and its enol derivatives, as for example d:l-$\Delta^{3:4:10:5}$-3-alkoxy or acyloxy-8-oxo-9-methyl-hexahydronaphthalenes, d:l-$\Delta^{4:10}$-3:8-dioxo-9-methyl-4-carboxymethyl-, carboxyethyl-, carboxypropyl-octalins and their functional derivatives, d:l-$\Delta^{1:2}$-3-oxo-4:7-dihydroxy-9-methyl-octalin, d:l-$\Delta^{1:2}$-3-oxo-6:7-isopropylidene-dihydroxy-9-methyl-octalin, d:l-$\Delta^{1:2:6:7}$-3-oxo-9-methyl-hexahydronaphthalene, d:l-oxo-octahydro-indene, d:l-1-oxo-8-methyl-octahydro-indene, d:l-1-oxo-5-hydroxy-8-methyl-octahydro-indene, d:l-1:5-dioxo-8-methyl-octahydro-indene, d:l-$\Delta^{4:9}$-1:5-dioxo-8-methyl-hexahydro-indene and its enol derivatives, as for example d:l-$\Delta^{4:5:3:9}$-1-oxo-5-alkoxy- or acyloxy-3-methyl-tetrahydro-indene, d:l-$\Delta^{4:9}$-1:5-dioxo-8-methyl-4-carboxy-methyl-carboxyethel or carboxypropyl-hexahydro-indene and their functional derivatives.

I have made the surprising observation that in the reduction according to this invention the enantimorphous forms of the racemates mentioned are hydrogenated at the same or different speed, depending on the constitution of the starting material. Derivatives of d,l-$\Delta^{4,10}$-3,8-dioxo-9-methyl-octalin, when subjected to the action of the aforementioned enzymes, are converted into two diastereoisomeric hydrogenation products, that is to say, conversion of the two enantiomorphous forms proceeds practically at the same rate.

The resulting diastereoisomers have different physical properties and are therefore easy to separate from each other and to isolate in pure form.

Differences in the reaction rate of the two enantiomorphous forms are observed, for example, with starting materials derived form d,l-$\Delta^{4,9}$-1,5-dioxo-8-methyl-hexahydro-indene. In these cases practically only one enantiomorphous form of the starting material is reduced, whereas the other remains unchanged.

The dehydrogenation by conventional methods of the optically active hydrogenation product results in the enantiomorphous form of the starting material.

The process is illustrated by the diagram of formulae below.

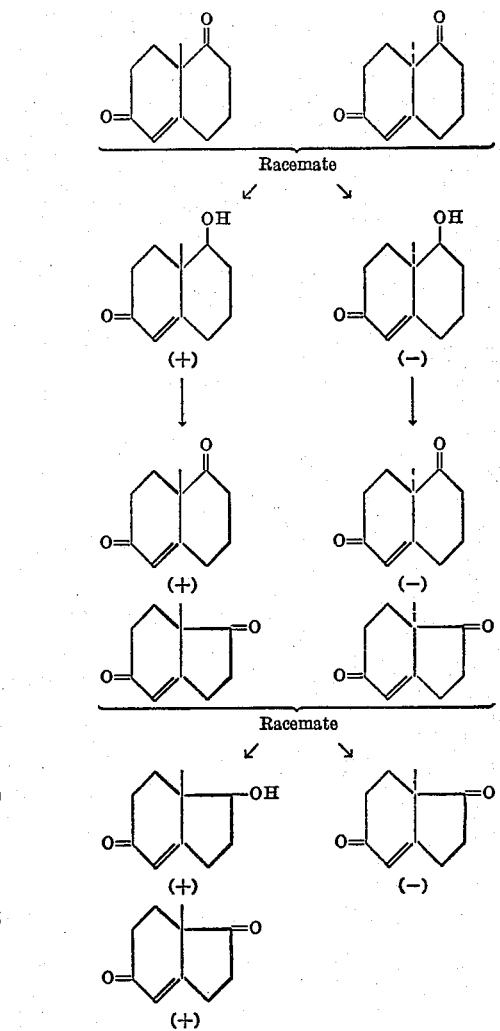

It is advantageously carried out in such a manner that the culture of a micro-organism is caused to act upon the starting material. According to the micro-organism used there are obtained, for example, two diastereomeric compounds in which one oxo group or carbon-carbon double bond is saturated with hydrogen. The process can, however, be carried out in such a manner that in one operation several cultures are caused to act upon the starting material, it having been proved advantageous in such a case to carry out the action of the individual cultures consecutively.

All those cultures of micro-organisms are suitable for the process that are capable of reducing the starting materials. The following are examples of a few species that can be used for the process: *Saccharomyces cerevisiae, Bacterium putrificus, Streptomyces coelicolor, Streptomyces lavendulae, Curvularia falcata, Rhizopus nigricans, Rhizopus arrhizus, Ophiobolus herpotrichus.* As is apparent from the foregoing, the micro-organisms used may be fungi, actinomycetes or bacteria.

In carrying out the process the starting materials may be incubated with cultures of the aforesaid micro-organisms under known anaerobic conditions, or even aerobic conditions. The growth may be carried out in a surface culture or, advantageously, a submerged culture, the material being agitated or stirred. The cultures contain assimilable carbon, for example carbohydrates, and if desired, growth-promoting substances, for example, corn-steep liquor or beer wort, and inorganic salts. Accordingly, natural, synthetic or semi-synthetic nutrient solutions may be used.

The following gives a description of the simplest method of carrying out the process, but the invention is not limited thereto: The organisms are cultured in apparatus and under conditions similar to those known as the so-called deep tank method in the production of antibiotics. After developing the culture, the starting material is added in the form of a fine dispersion or solution, for example in methanol, acetone or ethylene glycol, and incubation is continued. Finally the mycelium is separated, the filtrate and/or the mycelium mass is extracted, and the d-form and/or the l-form of the hydrogenation products and/or any enantiomorphous form of the starting material is isolated from the extract in known manner, for example, by a demixing method, adsorption, chromatography, crystallisation, conversion into functional derivatives such as Girard compounds or the like. The reactions may also be carried out by first separating the active enzymes partly or completely from the corresponding cultures of the aforesaid organisms and using them in the absence of the growing cultures. Thus, for example, the mycelium formed by the culture of the organism is separated, suspended in water or a buffer solution, and then the starting material is added to the resulting suspension and incubated. It is also possible to extract the enzymes from the cultures and to use the resulting extracts for the reactions.

If it is desired to use several micro-organisms in one operation, the procedure may be, for example, as follows: After developing the culture of the first organism the starting material is added in the form of a fine dispersion or solution, for example, in methanol, acetone or ethylene glycol, and incubation is continued until the maximum reaction has been attained. Then, without previous filtration or isolation of the reaction product, there is added to the reaction mixture a grown culture of the second organism and, if necessary, appropriate nutrient substances and growth-promoting substances, and the incubation is continued. The course of the different reductions can be followed by paper chromatography.

Racemate splitting by the new process is generally very simple, because the optically active hydrogenation products obtained can easily be separated from each other or the starting material owing to their different polarity.

The optically active compounds obtained can be used in the synthesis of optically active steroids, for example, by methods analogous to those applied to the corresponding racemic compounds. As a result of the classical investigations of Pasteur a microbiological method for recovering an antipode from racemates has occasionally been used. Ordinary fungi or bacteria have been used for this purpose, which assimilate the starting materials, the natural (d) antipodes being assimilated more rapidly than the non-natural (l) antipodes. In these processes, therefore, in order to obtain an optically pure product, the microbiological treatment must be continued until at least one form, and usually the biologically more interesting form, has been completely destroyed. In contradistinction thereto, the new process yields even with only partial reaction the hydrogenation products in an optically pure form.

The following examples illustrate the invention:

*Example 1*

In a shaking vessel, 40 grams of cane sugar, 40 grams of Difco tryptone, 8 grams of sodium nitrate, 4 grams of dipotassium phosphate, 2 grams of magnesium sulphate, 2 grams of potassium chloride and 0.04 grams of ferrous sulphate are dissolved in 4 liters of water, adjusted to pH 7, treated with 10 grams of calcium carbonate, sterilised and inoculated with a culture of *Curvularia falcata*. After 3 days shaking at 27° C. a solution is added of 1 gram of d:l-$\Delta^{4:10}$-3:8-dioxo-9-methyl-octalin in 15 cc. of acetone and shaking is continued. After 3 days, the mycelium is separated and washed with water and ethyl acetate. The combined filtrates are extracted by shaking with ethyl acetate and the extracts washed with diulte hydrochloric acid, potassium bicarbonate solution and water dried and evaporated under vacuum. The paper chromatographic examination of the residue (1.6 grams) shows the presence of $\Delta^{4:10}$-3-oxo-8-hydroxy-9-methyl-octalin and a little starting material. The residue is chromatographed on 80 grams of alumina by the fractional elution method, elution being carried out with benzene, benzene-ether mixtures, ether and ether-ethyl acetate mixtures. The paper chromatographic examination of the individual fractions (each 80 cc.) shows that the first benzene fractions contain starting material which is optically inactive. In the benzene fractions 5 and 6 there is a negatively rotating oil, which with p-nitrobenzoyl chloride in pyridine is converted into its p-nitrobenzoyl derivative (M. P. 106.5–107.5° C. $[\alpha]_D = -26°$). It contains no $\alpha:\beta$-unsaturated ketone and the elementary analysis corresponds to the empirical formula $C_{18}H_{21}O_5N$. Fractions 7–23 eluted with benzene contain an oil which possesses a positive optical rotation and constitutes (+)-$\Delta^{4:10}$-3-oxo-8-hydroxy-9-methyloctalin. With ether and with ether-ethyl acetate mixtures a strongly negatively rotating, crystalline substance is eluted which is recrystallized from ether-petroleum ether mixtures (M. P. 94–95° C., $[\alpha]_D = -129°$) and which constitutes (−)-$\Delta^{4:10}$-3-oxo-8-hydroxy-9-methyl-octalin. *Analysis.—* Found: C=73.00%, H=9.06%; ultra-violet adsorption spectrum in absolute alcohol: max. 240 m$\mu$ (log $\epsilon$=4.15); p-nitrobenzoate: M. P. 122.5° C., $[\alpha]_D = +87°$.

The oily (+)-$\Delta^{4:10}$-3-oxo-8-hydroxy-9-methyl-octalin forms a crystalline p-nitrobenzoate: M. P. 195° C., $[\alpha]_D = +159°$. By saponification by means of methanolic caustic potash solution, the free alcohol is reformed. It is distilled under high vacuum: $[\alpha]_D = +203°$, ultra-violet adsorption spectrum in absolute alcohol: max. 240 m/$\mu$ (log $\epsilon$=4.15).

*Example 2*

In a shaking vessel 4 liters of a nutrient solution that contains to 1 liter of tap water 20 grams of peptone, 5 m.³ of corn steep liquor and 50 grams of crude glucose are adjusted to pH 6.3, sterilised and inoculated with a culture of *Ophiobolus herpotrichus*. Shaking is carried out for 3 days at 27° C. and then under sterile conditions a solution added of 1 gram of d:l-$\Delta^{4:10}$-3:8-dioxo-9-methyl-octalin in 15 cc. of acetone and shaking continued at the same temperature. After 3 days, the mycelium is separated and washed with water and ethyl acetate. The combined filtrates are shaken with ethyl acetate and the extracts washed with dilute hydrochloric acid, potassium bicarbonate solution and water, dried and evaporated under vacuum. Paper chromatographic examination of the residue (1.01 grams) shows the presence of $\Delta^{4:10}$-3-oxo-8-hydroxy-9-methyl-octalin and of starting material. The residue is worked up as described in Example 1. There is obtained, together with a little optically inactive starting material, the crystalline (—)-$\Delta^{4:10}$-3-oxo-8-hydroxy-9-methyl-octalin (M. P. 94–95° C., $[\alpha]_D = -129°$) and the oily (+)-$\Delta^{4:10}$-3-oxo-8-hydroxy-9-methyl-octalin ($[\alpha]_D = +203°$).

Example 3

The nutrient solution described in Example 2 is inoculated with a culture of *Rhizopus nigricans*, instead of *Ophiobolus herpotrichus* and d:1 - $\Delta^{4,10}$ - 3:8 - diketo - 9 - methyl-octalin is incubated in the same manner. After extraction and working up in an analogous manner, there is obtained, in addition to a little starting material, crystalline (—)-$\Delta^{4:10}$-3-oxo-8-hydroxy-9-methyl-octalin of M. P. 94–95° C., $[\alpha]_D = -129°$ and the oily (+)-$\Delta^{4:10}$-3-oxo-8-hydroxy-9-methyl-octalin ($[\alpha]_D = +203°$).

Example 4

In a shaking vessel a solution of 40 grams of crude glucose, 20 grams of peptone, 15 grams of meat extract (Oxo Lab. Lemco) and 20 grams of sodium chloride in 4 liters of water is mixed with 40 grams of calcium carbonate, the pH value adjusted to 7.5, the mixture is sterilised and then inoculated with a culture of *Streptomyces coelicolor*. After agitation for 4 days at 27° C., there is added, as described in Example 1, a solution of 1 gram of d:1-$\Delta^{4:10}$-3:8-dioxo-9-methyl-octalin in 15 cc. of acetone and agitation is continued at 27° C. After 10 days, working up and chromatography are carried out as described in Example 1. There is obtained, in addition to a little starting material, the crystaline (—)-$\Delta^{4,10}$-3-oxo-8-hydroxy-9-methyl-octalin of M. P. 94–95° C., $[\alpha]_D = -126°$ and the oily (+)-$\Delta^{4:10}$-3-oxo-8-hydroxy-9-methyl-octalin ($[\alpha]_D = +203°$).

Example 5

A solution of 0.25 gram of (—)-$\Delta^{4:10}$-3-oxo-8-hydroxy-9-methyl-octalin in 4 cc. of pyridine is treated with 4 cc. of a pyridine-chromium oxide complex suspension, corresponding to 0.340 gram of chromiumtrioxide. The mixture is allowed to stand at room temperature and after 2 days 20 cc. of water are added. The solution is then concentrated under vacuum at 35° C. and extracted by shaking with a benzene-ether mixture. The extracts are washed until neutral, dried and evaporated. The residue is chromatographed on 8 grams of alumina by the fractional elution method, elution being carried out with benzene-petroleum ether mixtures, benzene, benzene-ether mixtures and with ether. The benzene-petroleum ether and the benzene eluates contain (—)-$\Delta^{4:10}$-3:8-dioxo-9-methyl-octalin which is crystallised from an ether-petroleum ether mixture, M. P. 50.5° C., $[\alpha]_D = -100°$, ultraviolet absorption spectrum in absolute alcohol: $\lambda$ max. 244 m$\mu$ (log $\epsilon = 4.10$). The benzene-ether and ether fractions contain also some starting material.

Example 6

250 mg. of (+)-$\Delta^{4:10}$-3-oxo-8-hydroxy-9-methyl-octalin are oxidised as described in Example 5 with pyridine-chromium oxide complex, worked up and chromatographically purified. There is obtained together with some starting material, the (+)-$\Delta^{4:10}$-3:8-dioxo-9-methyl-octalin which is recrystallised from an ether-petroleum ether mixture, M. P. 50° C., $[\alpha]_D = +100°$, ultra-violet absorption spectrum in absolute alcohol: $\lambda$ max. 244 m$\mu$ (log $\epsilon = 4.10$).

Example 7

In a shaking vessel 40 grams of cane sugar, 40 grams of Difco triptone, 8 grams of sodium nitrate, 4 grams of secondary potassium phosphate, 2 grams of magnesium sulfate, and 0.04 gram of ferrosulfate are dissolved in 4 liters of water, the pH adjusted to 7, the solution mixed with 10 grams of calcium carbonate, sterilized, and inoculated with a culture of *Curvularia falcata*. The culture is shaken for 36 hours at 27° C. after which a solution of 0.430 gram of d,l-$\Delta^{4,9}$-1,5-dioxo-8-methylhexahydro-indene in 10 cc. of acetone is added under sterile conditions, and shaking continued at 27° C. After 3 days the mycelium is separated and washed with acetone and ethyl acetate. The combined filtrates are exhaustively extracted with ethyl acetate. The extracts are washed with dilute hydrochloric acid, sodium bicarbonate solution and water, dried and evaporated under reduced pressure. The residue is chromatographed on 100 grams of alumina by the fractional elution method with the use of benzene-ether mixtures, ether, ether-ethyl acetate mixtures, ethyl-acetate, and methanol. The individual fractions (200 cc. each) are evaporated in vacuo and investigated by paper chromatography (propylene glycol-toluene system). The first two benzene fractions contain only oily impurities, whereas the other benzene fractions contain a substance which in the paper chromatogram behaves like the starting material ($R_F = 0.68$). These fractions are combined and distilled in a high vacuum. From an ether-petroleum ether mixture crystals are obtained which melt at 58–60° C., $[\alpha]_D = -312°$ (in benzene). The U. V. and I. R. adsorption spectra are identical with those of the starting material. The substance thus is the l-$\Delta^{4,9}$-1,5-dioxo-8-methyl-hexahydro-indene.

The portions eluated with benzene-ether mixtures (19:1 and 9:1) consist of d-$\Delta^{4,9}$-5-oxo-1-hydroxy-8-methyl-hexahydro-indene which has an $R_F$ value of 0.12 and is obtained in the form of a dextrorotary oil absorbing U. V.-rays. With benzene-ether mixtures (4:1) small quantities of a levorotary and U. V.-absorbing oil are eluated which in the paper chromatogram shows the same behavior and is the l-$\Delta^{4,9}$-5-oxo-1-hydroxy-8-methyl-hexahydro-indene. The fractions eluated with ether, ether-ethyl acetate mixtures, ethylacetate, and methanol show no optical activity.

Example 8

In an Erlenmeyer flask 100 cc. of beer wort are sterilized and inoculated with a culture of *Rhizopus nigricans*. After 24 hours' shaking at 25° C. there is added under sterile conditions a solution of 0.03 gram of d,l-$\Delta^{4,9}$-1,5-dioxo-8-methyl-hexahydro-indene in 1.5 cc. of acetone. Shaking is continued for 5 days at 25° C. and the culture then extracted with ethyl acetate. Paper-chromatographic examination of the extraction residue shows the presence of l - $\Delta^{4,9}$ - 1,5 - dioxo - 8 - methyl - hexahydro - indene ($R_F = 0.68$), d - $\Delta^{4,9}$ - 5 - oxo - 1 - hydroxy - 8 - methyl-hexahydro-indene ($R_F = 0.12$), and a further U. V.-absorbing substance of $R_F = 0.05$.

Example 9

In an Erlenmeyer flask 100 m.³ of a sterile nutrient solution containing per liter of tap water 20 grams of peptone, 5 cc. of corn steep liquor and 50 grams of glucose are inoculated with a culture of *Ophiobolus herpotrichus*. After 24 hours' shaking at 25° C. there is added under sterile conditions a solution of 0.03 gram of d,l-$\Delta^{4,9}$-1,5-dioxo-8-methyl-hexahydro-indene in 1.5 cc. of acetone. Shaking is continued for 5 days at 25° C. and the culture then extracted with ethyl acetate. Chromatographic examination of the extraction residue shows the presence of l-$\Delta^{4,9}$-1,5-dioxo-8-methyl-hexahydro-indene ($R_F = 0.68$), d-$\Delta^{4,9}$-5-oxo-1-hydroxy-8-methyl-hexahydro-indene ($R_F = 0.12$) and a further U. V.-absorbing substance of $R_F = 0.05$.

Example 10

In an Erlenmeyer flask 100 cc. of a sterile nutrient solution containing per liter of tap water 10 grams of glucose, 5 grams of peptone, 3 grams of meat extract (Oxo Lab. Lemco), 5 grams of sodium chloride, and 10 grams of calcium carbonate are inoculated with a culture of *Streptomyces coelicolor*. After 24 hours' shaking at 25° C. there is added under sterile conditions a solution of 0.03 gram of d,l - $\Delta^{4,9}$ - 1,5 - dioxo - 8 - methyl-hexahydro-indene in 1.5 cc. of acetone. Shaking is continued for 5 days at 25° C. and the culture then extracted with ethyl acetate. Paper chromatographic examination of the extraction residue shows the presence of l-$\Delta^{4,9}$-1,5-dioxo-8-methyl-hexahydro-indene ($R_F$=0.68) and d-$\Delta^{4,9}$-5 - oxo - 1 - hydroxy - 8 - methyl - hexahydro - indene ($R_F$=0.68).

What is claimed is:

1. Process for splitting racemates, which comprises subjecting racemates of bicyclic-alicyclic compounds containing at least one grouping reducible with the formation of a new centre of asymmetry, to the action of reducing enzymes produced by cultures of microorganisms, isolating at least one of the resulting optically active products and subjecting any hydrogenated product obtained to the action of a dehydrogenating agent.

2. Process according to claim 1, wherein cultures of microorganisms capable of reducing oxo groups to hydroxy groups are used.

3. Process according to claim 1, wherein cultures of microorganisms capable of reducing a carbon-to-carbon double bond are used.

4. Process according to claim 1, wherein several microorganisms are used in the same operation.

5. Process according to claim 1, wherein racemates of the hydronaphthalene series are used as starting material.

6. Process for splitting racemates which comprises subjecting a member selected from the group consisting of a racemic dihydro-, tetrahydro-, hexahydro-, octahydro and decahydro-naphthalene compound containing as reducible grouping at least one member selected from the group consisting of a carbon-to-oxygen and a carbon-to-carbon double bond, at least one of which being of such nature that a new centre of asymmetry is formed on its saturation, to the action of reducing enzymes produced by cultures of microorganisms, isolating at least one of the resulting optically active products and subjecting any hydrogenated product obtained to the action of a dehydrogenating agent.

7. Process according to claim 6, wherein d,l-8-oxo-decalin is used as starting material.

8. Process according to claim 6, wherein d,l-3.8-dioxo-decalin is used as starting material.

9. Process according to claim 6, wherein d,l-8-oxo-9-methyl-decalin is used as starting material.

10. Process according to claim 6, wherein d,l-3.8-dioxo-9-methyl-decalin is used as starting material.

11. Process according to claim 6, wherein d,l-$\Delta^{4,10}$-3-oxo-octalin is used as starting material.

12. Process according to claim 6, wherein d,l-$\Delta^{4,10}$-3,8-dioxo-octalin is used as starting material.

13. Process according to claim 6, wherein d,l-$\Delta^{4,10}$-3-oxo-9-methyl-octalin is used as starting material.

14. Process according to claim 6, wherein d,l-$\Delta^{4,10}$-3,8-dioxo-9-methyl-octalin is used as starting material.

15. Process according to claim 1, wherein racemates of the hydro-indene series are used as starting material.

16. Process for splitting racemates which comprises subjecting a member selected from the group consisting of a racemic dihydro-, tetrahydro-, hexahydro- and octa-hydroindene compound containing as reducible grouping at least one member selected from the group consisting of a carbon-to-carbon and a carbon-to-oxygen double bond, at least one of which being of such nature that a new centre of asymmetry is formed on its saturation, to the action of reducing enzymes produced by cultures of microorganisms, isolating at least one of the resulting optically active products and subjecting any hydrogenated product obtained to the action of a dehydrogenating agent.

17. Process according to claim 16, wherein the d,l-$\Delta^{4,9}$-1,5-dioxo-8-methyl-hexahydro-indene is used as starting material.

18. Process according to claim 1, wherein a culture of *Saccharomyces cerevisiae* is used.

19. Process according to claim 1, wherein a culture of *Bacterium putrificus* is used.

20. Process according to claim 1, wherein a culture of actinomycetes selected from the groups consisting of the species *Streptomyces lavendulae* and *Streptomyces coelicolor* is used.

21. Process according to claim 1, wherein a culture of *Curvularia falcata* is used.

22. Process according to claim 1, wherein a culture of fungi selected from the group consisting of the species *Rhizopus nigricans* and *Rhizopus arrhizus* is used.

23. Process according to claim 1, wherein a culture of *Ophiobolus herpotrichus* is used.

24. Process for splitting racemate, which comprises subjecting racemates of bicyclic-alicyclic compounds containing at least one grouping reducible with the formation of a new centre of asymmetry, to the action of reducing enzymes produced by cultures of microorganisms, and isolating at least one of the resulting optically active products.

25. Process for splitting racemates which comprises subjecting a member selected from the group consisting of a racemic dihydro-, tetrahydro-, hexahydro-, octahydro- and decahydro-naphthalene compound containing as reducible grouping at least one member selected from the group consisting of a carbon-to-oxygen and a carbon-to-carbon double bond, at least one of which being of such nature that a new centre of asymmetry is formed on its saturation, to the action of reducing enzymes produced by cultures of microorganisms, and isolating at least one of the resulting optically active products.

26. Process for splitting racemates which comprises subjecting a member selected from the group consisting of a racemic dihydro-, tetrahydro-, hexahydro-, and octahydro-indene compound containing a reducible grouping at least one member selected from the group consisting of a carbon-to-carbon and a carbon-to-oxygen double bond, at least one of which being of such nature that a new centre of asymmetry is formed on its saturation, to the action of reducing enzymes produced by cultures of microorganisms, and isolating at least one of the resulting optically active products.

References Cited in the file of this patent

UNITED STATES PATENTS

| | | |
|---|---|---|
| 2,186,906 | Mamoli | Jan. 9, 1940 |
| 2,341,110 | Mamoli | Feb. 8, 1944 |
| 2,511,867 | Newberg et al. | June 20, 1950 |
| 2,602,769 | Murray | July 8, 1952 |
| 2,616,828 | Levintow et al. | Nov. 4, 1952 |
| 2,658,023 | Shull | Nov. 3, 1953 |
| 2,778,776 | Wettstein | Jan. 22, 1957 |

OTHER REFERENCES

Karrer: Organic Chemistry, 4th English Edition, Elsevir Pub. Co., Inc., 1950, page 103.